United States Patent
Zhang

(10) Patent No.: US 10,855,218 B2
(45) Date of Patent: Dec. 1, 2020

(54) ELECTRONIC POLE CHANGING-BASED INDUCTION MOTOR CONTROL SYSTEM AND CONTROL METHOD THEREOF

(71) Applicant: SHENZHEN YUNLIN ELECTRIC CO., LTD., Shenzhen (CN)

(72) Inventor: Jing Zhang, Guangzhou (CN)

(73) Assignee: SHENZHEN YUNLIN ELECTRIC CO., LTD., Shenzhen (CN)

( * ) Notice: Subject to any disclaimer, the term of this patent is extended or adjusted under 35 U.S.C. 154(b) by 8 days.

(21) Appl. No.: 16/336,446

(22) PCT Filed: Apr. 6, 2017

(86) PCT No.: PCT/CN2017/079531
§ 371 (c)(1),
(2) Date: Mar. 25, 2019

(87) PCT Pub. No.: WO2018/129819
PCT Pub. Date: Jul. 19, 2018

(65) Prior Publication Data
US 2020/0067442 A1 Feb. 27, 2020

(30) Foreign Application Priority Data
Jan. 13, 2017 (CN) .......................... 2017 1 0025198

(51) Int. Cl.
*H02P 25/20* (2006.01)
(52) U.S. Cl.
CPC ................... *H02P 25/20* (2013.01)
(58) Field of Classification Search
CPC ..................................................... H02P 25/20
See application file for complete search history.

(56) References Cited

U.S. PATENT DOCUMENTS

2014/0312809 A1* 10/2014 Ishida ................... H02P 27/08
318/139
2017/0050668 A1* 2/2017 Kikuchi .................. H02K 3/28

FOREIGN PATENT DOCUMENTS

| CN | 101734174 A | 6/2010 |
| CN | 106549621 A | 3/2017 |

(Continued)

*Primary Examiner* — Cortez M Cook
(74) *Attorney, Agent, or Firm* — JCIP GLOBAL INC.

(57) ABSTRACT

The present invention relates to an electronic pole changing-based induction motor control system and a control method thereof. Such induction motor control system comprises an induction motor, an inverter and a DC power supply. The inverter is connected with the motor and the DC power supply respectively, for converting a direct current supplied by the DC power supply to an alternating current supplied to the motor. The motor comprises N three-phase windings (11, 12; 31, 32). The inverter comprises N inversion driving units (21, 22; 41, 42) and at least one control unit. Each inversion driving unit is connected with one three-phase winding. The control unit controls the inversion driving unit to generate a current of the three-phase winding connected thereto, and frequency, amplitude and phase of the current can be controlled by the control unit. The control unit alters current directions or phase angles of at least part of the three-phase windings according to a synchronous rotational speed of the motor, making N three-phase windings form at least two pole-pair numbers. The induction motor control system enhances the low-speed torque and broadens the speed governing operation range, thereby enhancing the control accuracy and operation efficiency, and simplifying a peripheral transmission mechanism.

17 Claims, 5 Drawing Sheets

(56) References Cited

FOREIGN PATENT DOCUMENTS

| | | |
|---|---|---|
| CN | 206323324 U | 7/2017 |
| WO | 2016114353 A1 | 7/2016 |

\* cited by examiner

ELECTRONIC POLE CHANGING-BASED INDUCTION MOTOR CONTROL SYSTEM AND CONTROL METHOD THEREOF

CROSS-REFERENCE TO RELATED APPLICATION

This application is the US national phase of International Application No. PCT/CN2017/079531 filed on Apr. 6, 2017, the contents of which are incorporated herein by reference in their entirety.

TECHNICAL FIELD

The present invention relates to the field of induction motors, and particularly relates to an electronic pole changing-based induction motor control system and a control method thereof.

BACKGROUND

At present, induction motor control systems are applied in fields such as electric vehicle, elevator, machine tool servo system and the like increasingly. Generally, these application fields require the induction motor control system to provide a large torque at low speed, while require the induction motor control system to possess a wide speed governing operation range.

Generally, under the circumstance of a constant pole-pair number, as a synchronous rotational speed of motor increases, the motor provides a constant torque when the synchronous rotational speed of motor is less than a synchronous rotational speed which corresponds to the pole-pair number at the fundamental frequency. However, when the synchronous rotational speed of motor is higher than the synchronous rotational speed which corresponds to the pole-pair number at the fundamental frequency, the torque provided by the motor decreases non-linearly, and it leads to difficult control when the synchronous rotational speed of motor increases to a certain extent.

According to a direct proportional relation of a motor rotational speed to an input frequency of working power supply: $n=60f(1-s)/p$ (wherein, n, f, s and p represent the motor rotational speed, the input frequency, a motor slip ratio and a motor pole-pair number, respectively), frequency control or pole-changing control is generally used in the induction motor control system to broaden the speed governing operation range of induction motor control system. Conventional frequency control fails to meet the requirement of providing large torque at low speed and possessing wide speed governing operation range. The pole-changing control is usually achieved in the induction motor control system by using a mechanical speed regulation device and a speed regulation method. However, such mechanical speed regulation device and speed regulation method have drawbacks as follows: (1) the pole-changing control could not be done until the power is off to change the wiring, decreasing a control accuracy and operation efficiency of the induction motor control system; (2) there are only few variable speeds, making the speed governing operation range narrow.

SUMMARY OF THE INVENTION

The objective of the present invention is to provide an electronic pole changing-based induction motor control system and a control method thereof, which uses electronic pole changing to enhance a low-speed torque of the induction motor control system and to broaden a speed governing operation range of the induction motor control system, so as to improve the control accuracy and operation efficiency of the system and simplify the peripheral transmission mechanism.

The present invention provides an electronic pole changing-based induction motor control system, comprising a motor, an inverter and a DC power supply; the inverter is connected with the motor and the DC power supply respectively, for converting a direct current supplied by the DC power supply to an alternating current supplied to the motor; the motor comprises N three-phase windings, wherein N is an integer bigger than 1; the inverter comprises N inversion driving units and at least one control unit; each inversion driving unit is connected with one three-phase winding; the control unit controls the inversion driving unit to generate a current of the three-phase winding connected thereto; and the control unit alters current directions or phase angles of at least part of the three-phase windings according to a synchronous rotational speed of the motor, making said N three-phase windings form at least two pole-pair numbers.

With respect to the conventional pole-changing control devices, the electronic pole changing-based induction motor control system of the present invention does not need to cut the power off, or to alter the wiring either during the pole-changing control process, effectively enhancing the control accuracy and operation efficiency of the induction motor control system. The present invention is provided with a plurality of inversion driving units and a plurality of three-phase windings, thus the induction motor control system is able to form at least two pole-pair numbers, and therefore the induction motor control system can achieve a wider speed governing operation range.

In one implementation, the control unit comprises a synchronous rotational speed operation module, for calculating the synchronous rotational speed of the motor. Therefore, the induction motor control system does not need an additional speed sensor to detect the rotational speed of the motor, simplifying the structure of the induction motor control system.

In one implementation, the inversion driving unit comprises three output ends, each three-phase winding comprises three sub-windings, and input ends of three sub-windings are respectively connected with three output ends of the inversion driving unit.

In one implementation, N three-phase windings form a NY structure or a NΔ structure or an aYbΔ structure, wherein both a and b are integers bigger than 1, and a+b=N.

In one implementation, the inverter comprises one control unit which controls N inversion driving units respectively; or the inverter comprises a plurality of control units, and each control unit controls one or more inversion driving units. According to needs, an inverter only having one control unit but with strong functions may be selected, and an inverter having a plurality of control units may also be selected.

In one implementation, the control unit is one or more of MCU, DSP, FPGA and CPLD. By using these control units, a motor control algorithm in the prior art may be used to achieve control of the motor via the inversion driving unit.

The present invention also provides a control method of the above-mentioned electronic pole changing-based induction motor control system, comprising that the control unit controls the inversion driving unit to generate a current of the three-phase winding connected thereto; the control unit alters current directions or phase angles of at least part of the three-phase windings according to the synchronous rotational speed of the motor, making N three-phase windings form at least two pole-pair numbers; and the control unit controls N inversion driving units according to the synchronous rotational speed of the motor, to alter the current directions or phase angles of at least part of the three-phase windings, making the motor switch between the at least two pole-pair numbers. The present invention enables the motor to achieve at least two pole-pair numbers by using a pole-changing manner, and thus the induction motor control system can achieve a wider speed governing operation range.

In one implementation, one or more rotational speed threshold values are set, one rotational speed threshold value corresponds to one pole-pair number, and each rotational speed threshold value equals a synchronous rotational speed to which a fundamental frequency corresponds when the motor forms the pole-pair number which corresponds to the rotational speed threshold value.

In another implementation, one or more rotational speed threshold values are set, one rotational speed threshold value corresponds to one pole-pair number, wherein at least one rotational speed threshold value is greater than a synchronous rotational speed to which a fundamental frequency corresponds when the motor forms the pole-pair number which corresponds to the rotational speed threshold value, and other rotational speed threshold values equal the synchronous rotational speeds to which the fundamental frequency corresponds when the motor forms the pole-pair numbers which correspond to these rotational speed threshold values; an increased amplitude of the at least one rotational speed threshold value is set according to flux-weakening property of the motor. The induction motor control system is enabled to achieve a larger torque in partial speed range by using such method.

When the synchronous rotational speed of the motor increases to one of the rotational speed threshold values, the control unit alters the current directions or phase angles of at least part of the three-phase windings, making the pole-pair numbers formed by N three-phase windings decrease; and when the synchronous rotational speed of the motor decreases to one of the rotational speed threshold values, the control unit alters the current directions or phase angles of at least part of the three-phase windings, making the pole-pair numbers formed by N three-phase windings increase.

The electronic pole changing-based induction motor control system and the control method thereof in the present invention possess following beneficial effects:

(1) Speed governing of the induction motor control system is achieved by using pole-changing, without the need of cutting the power off, or altering the wiring either during the pole-changing control process, effectively enhancing the control accuracy and operation efficiency of the induction motor control system.

(2) The control unit controls a plurality of inversion driving units to alter the current direction or phase angle of a plurality of three-phase windings, making the induction motor control system form at least two pole-pair numbers, increasing the low-speed torque of the induction motor control system, and enabling the induction motor control system to achieve a wider speed governing operation range.

(3) Electronic pole-changing control of the induction motor control system is achieved by using the inverter, and peripheral transmission mechanism of the induction motor control system may be greatly simplified, lowering cost of the system and enhancing the energy-saving effect.

DESCRIPTION OF REFERENCE SIGNS

Figure 1:
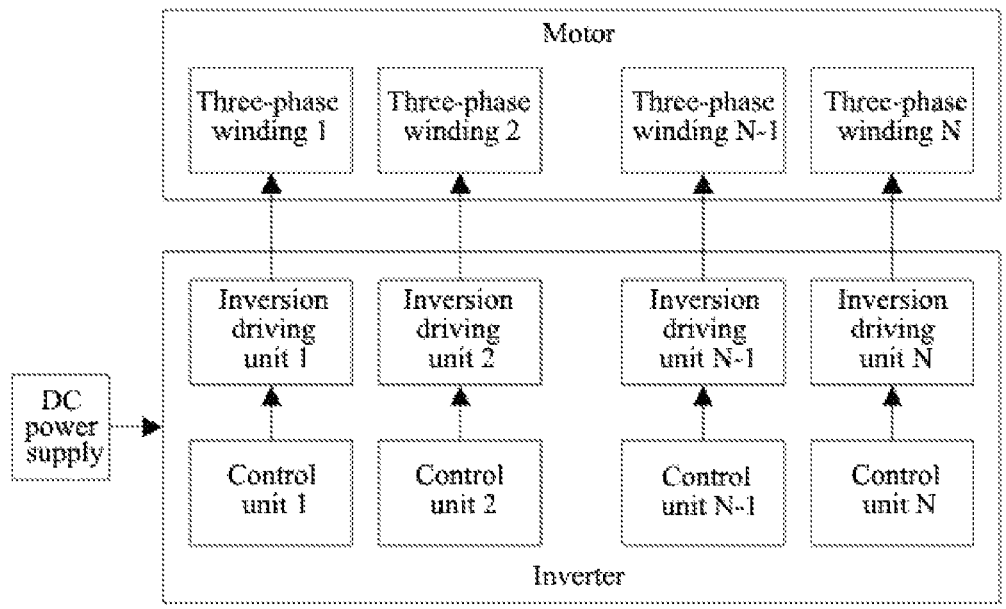
FIG. 1 is a schematic view of an induction motor control system in one embodiment.

11 represents three-phase winding 1b, 12 represents three-phase winding 2b, 21 represents inversion driving unit 1b, 22 represents inversion driving unit 2b, 31 represents three-phase winding 1c, 32 represents three-phase winding 2c, 41 represents inversion driving unit 1c, and 42 represents inversion driving unit 2c.

DESCRIPTION OF THE PREFERRED EMBODIMENTS

The present invention is further described in detail in the following in combination with specific embodiments and accompanied drawings.

Embodiment 1

As shown in FIG. 1, an electronic pole changing-based induction motor control system comprises a motor, an inverter and a DC power supply. The inverter is connected with the motor and the DC power supply respectively for converting a direct current supplied by the DC power supply into an alternating current supplied to the motor.

The motor comprises N three-phase windings, wherein N is an integer bigger than 1. Said N three-phase windings are the three-phase winding 1, the three-phase winding 2 . . . and the three-phase winding N, respectively. The inverter comprises N inversion driving units and at least one control unit. Said N inversion driving units are the inversion driving unit 1, the inversion driving unit 2 . . . and the inversion driving unit N, respectively. Each inversion driving unit is connected with one three-phase winding, that is to say, the inversion driving unit n is connected with the three-phase winding n (n is an arbitrary integer from 1 to N). The control unit controls the inversion driving unit n to generate a current of the three-phase winding n connected thereto. According to a synchronous rotational speed of the motor, the control units control at least part of the inversion driving units to alter current directions or phase angles of the three-phase windings which are connected to these inversion driving units, making N three-phase windings form at least two pole-pair numbers.

The induction motor control system of the present embodiment controls the inversion driving units to alter the pole-pair numbers of the three-phase windings through the control units of the inverter, that is to say, altering pole-pair numbers of the motor by using a pole changing manner. With respect to the conventional mechanical pole-changing control device, the electronic pole changing-based induction motor control system of the present embodiment does not need to cut the power off, or to alter the wiring either during the pole-changing control process, effectively enhancing the control accuracy and operation efficiency of the induction motor control system.

The induction motor control system of the present embodiment is provided with a plurality of inversion driving units and a plurality of three-phase windings, and thus the induction motor control system can form at least two pole-pair numbers. Therefore, the induction motor control system can achieve a wider speed governing operation range.

The inverter can comprise one control unit which controls N inversion driving units, respectively. The inverter can also comprise a plurality of control unit, each of which controls one or more inversion driving units. Preferably, the inverter comprises N control units, each of which controls one inversion driving unit.

The control unit is one or more of MCU, DSP, FPGA, CPLD and etc. A motor control algorithm in the prior art may be used to achieve control of the motor via the control unit.

The control unit comprises a synchronous rotational speed operation module, for calculating the synchronous rotational speed of the motor. Therefore, the induction motor control system does not need an additional speed sensor to detect the rotational speed of the motor, simplifying the structure of the induction motor control system.

Embodiment 2

Figure 2:
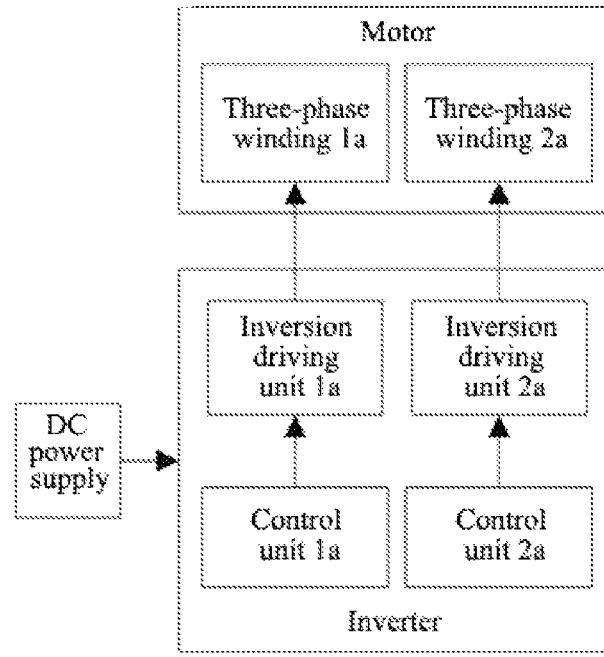
FIG. 2 is a schematic view of an induction motor control system having two three-phase windings in one embodiment.

As shown in FIG. 2, an electronic pole changing-based induction motor control system of the present embodiment comprises a motor, an inverter and a DC power supply. The motor comprises two three-phase windings, i.e. three-phase winding 1a and three-phase winding 2a, respectively. The inverter comprises two inversion driving units and two control units. Said two inversion driving units are inversion driving unit 1a and inversion driving unit 2a, respectively. Said two control units are control unit 1a and control unit 2a, respectively. The control unit 1a controls the inversion driving unit 1a to alter a current direction or a phase angle of the three-phase winding 1a. The control unit 2a controls the inversion driving unit 2a to alter a current direction or a phase angle of the three-phase winding 2a.

Embodiment 3

Figure 3:
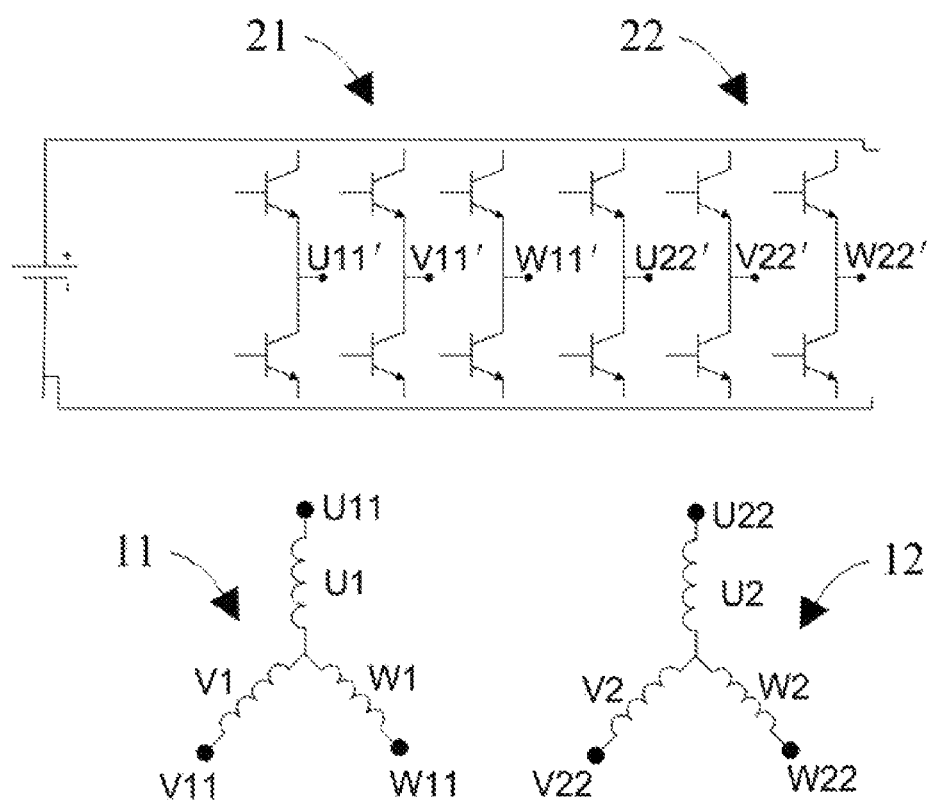
FIG. 3 is a partial circuit diagram of an induction motor control system in which the three-phase windings form a YY structure in one embodiment.

As shown in FIG. 3, the induction motor control system of the present embodiment employs a YY AC-motor. FIG. 3 only shows a partial circuit diagram for achieving pole changing. In the present embodiment, the motor comprises two three-phase windings, i.e. three-phase winding 1b (11) and three-phase winding 2b (12), respectively. These two three-phase windings form a 2Y structure. The inverter comprises two inversion driving units, i.e. inversion driving unit 1b (21) and inversion driving unit 2b (22), respectively. The control unit (not shown) controls the inversion driving unit 1b (21) to alter a current direction or a phase angle of the three-phase winding 1b (11), and controls the inversion driving unit 2b (22) to alter a current direction or a phase angle of the three-phase winding 2b (12). Particularly, the number of the control unit can be one or two.

The inversion driving unit comprises three output ends. Each three-phase winding comprises three sub-windings, and input ends of three sub-windings are respectively connected with three output ends of the inversion driving unit. Specifically, see FIG. 3, the input ends U11, V11, W11 of three sub-windings of the three-phase winding 1b (11) are respectively connected with three output ends U11', V11', W11' of the inversion driving unit 1b (21); the input ends U22, V22, W22 of three sub-windings of the three-phase winding 2b (12) are respectively connected with three output ends U22', V22', W22' of the inversion driving unit 2b (22).

The induction motor control system shown in the present embodiment only comprises two three-phase windings and two inversion driving units, but an induction motor control system having N three-phase windings and N inversion driving units as described in Embodiment 1 may be formed also.

Embodiment 4

Figure 4:
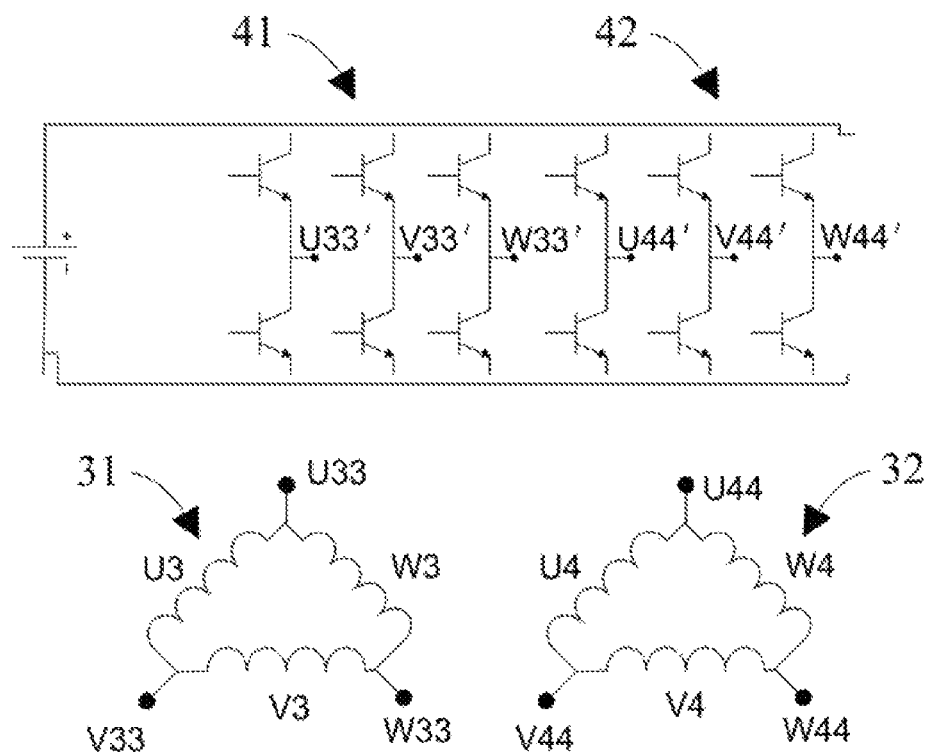
FIG. 4 is a partial circuit diagram of an induction motor control system in which the three-phase windings form a ΔΔ structure in one embodiment.

As shown in FIG. 4, the induction motor control system of the present embodiment employs a ΔΔ AC-motor. FIG. 4 only shows a partial circuit diagram for achieving pole changing. In the present embodiment, the motor comprises two three-phase windings, i.e. three-phase winding 1c (31) and three-phase winding 2c (32), respectively. These two three-phase windings form a 2Δ structure. The inverter comprises two inversion driving units, i.e. inversion driving unit 1c (41) and inversion driving unit 2c (42), respectively. The control unit (not shown) controls the inversion driving unit 1c (41) to alter a current direction or a phase angle of the three-phase winding 1c (31), and controls the inversion driving unit 2c (42) to alter a current direction or a phase angle of the three-phase winding 2c (32). Particularly, the number of the control unit can be one or two.

The inversion driving unit comprises three output ends. Each three-phase winding comprises three sub-windings, and input ends of three sub-windings are respectively connected with three output ends of the inversion driving unit. Specifically, see FIG. 4, the input ends U33, V33, W33 of three sub-windings of the three-phase winding 1c (31) are respectively connected with three output ends U33', V33', W33' of the inversion driving unit 1c (41); the input ends U44, V44, W44 of three sub-windings of the three-phase winding 2c (32) are respectively connected with three output ends U44', V44', W44' of the inversion driving unit 2c (42).

The induction motor control system shown in the present embodiment only comprises two three-phase windings and two inversion driving units, but an induction motor control system having N three-phase windings and N inversion driving units as described in Embodiment 1 may be formed also.

Embodiment 5

N three-phase windings of the induction motor control system of the present embodiment form an aYbΔ structure, wherein a and b are integers greater than 1, and a+b=N. That is to say, the induction motor control system comprises a three-phase windings which form an aY structure and b three-phase windings which form a bΔ structure.

Embodiment 6

The present embodiment provides a control method of the electronic pole changing-based induction motor control system of any of the above Embodiments 1-5. The control method of the present embodiment comprises: the control unit controls the inversion driving unit to generate a current of the three-phase winding connected thereto; the control unit alters current directions or phase angles of at least part of the three-phase windings according to the synchronous rotational speed of the motor, making N three-phase windings form at least two pole-pair numbers; and the control unit controls N inversion driving units according to the synchronous rotational speed of the motor, to alter the current directions or phase angles of at least part of the three-phase windings, making the motor switch between the at least two pole-pair numbers.

In the present embodiment, the induction motor control system is enabled to achieve at least two pole-pair numbers by altering the current directions or phase angles of a plurality of three-phase windings, thus achieving a wider speed governing operation range.

The control unit can achieve control of the current direction and phase angle of the three-phase winding by using a motor control algorithm in the prior art. Therefore, the present embodiment achieves pole-changing control of the induction motor control system by using electronic pole changing, without the need of cutting the power off, or altering the wiring either during the pole-changing control process, effectively enhancing the control accuracy and operation efficiency of the motor system.

Specifically, one or more rotational speed threshold values can be set in advance, one rotational speed threshold value corresponds to one pole-pair number, and each rotational speed threshold value equals a synchronous rotational speed to which a fundamental frequency corresponds when the motor forms the pole-pair number which corresponds to the rotational speed threshold value. When the synchronous rotational speed of the motor increases to one of the rotational speed threshold values, the control unit alters the current directions or phase angles of at least part of the three-phase windings, making the pole-pair numbers formed by N three-phase windings decrease; and when the synchronous rotational speed of the motor decreases to one of the rotational speed threshold values, the control unit alters the current directions or phase angles of at least part of the three-phase windings, making the pole-pair numbers formed by said N three-phase windings increase.

Through the control method of the electronic pole changing-based induction motor control in the present embodiment, the pole-pair numbers formed by the motor are decreased when the synchronous rotational speed of the motor increases to one of the set rotational speed threshold values in the case of increasing the synchronous rotational speed of the motor, and by this time, the motor provides a smaller constant torque but achieves a higher speed; and the pole-pair numbers formed by the motor are increased when the synchronous rotational speed of the motor decreases to one of the set rotational speed threshold values in the case of decreasing the synchronous rotational speed of the motor, and thus the motor can provide a larger constant torque. By using the control method of the electronic pole changing-based induction motor control system in the present embodiment, the induction motor control system is enabled to achieve a wider speed governing operation range, and to operate stably within such wider speed governing operation range.

Further, in order to achieve a larger torque within a partial speed range, at least one rotational speed threshold value can also be configured to be greater than a synchronous rotational speed to which a fundamental frequency corresponds when the motor forms the pole-pair number which corresponds to the rotational speed threshold value, and other rotational speed threshold values equal the synchronous rotational speeds to which the fundamental frequency corresponds when the motor forms the pole-pair numbers which correspond to these rotational speed threshold values. Particularly, an increased amplitude of such at least one rotational speed threshold value is set according to flux-weakening property of the motor. Herein, the rotational speed threshold value with increased amplitude is referred to as high-amplitude rotational speed threshold value.

By increasing at least one rotational speed threshold value, a high-amplitude rotational speed threshold value is formed, so that in the case of increasing the synchronous rotational speed of the motor, when the synchronous rotational speed increases to the high-amplitude rotational speed threshold value, the pole-pair numbers of the motor are decreased. So, within the range that the synchronous rotational speed increases to the high-amplitude rotational speed threshold value from the synchronous rotational speed to which the fundamental frequency corresponds, the torque of motor decreases non-linearly but is greater than the torque of motor provided by the aforementioned solution (the pole-pair numbers of the motor are decreased when the synchronous rotational speed equals the synchronous rotational speed to which the fundamental frequency corresponds) in the present embodiment. In the case of decreasing synchronous rotational speed of the motor, when the synchronous rotational speed decreases to the high-amplitude rotational speed threshold value, the pole-pair numbers of the motor are increased in advance. So, within the range that the synchronous rotational speed decreases to the high-amplitude rotational speed threshold value from the synchronous rotational speed to which the fundamental frequency corresponds, the torque of motor increases non-linearly but is greater than the torque of motor provided by the aforementioned solution (the pole-pair numbers of the motor are increased when the synchronous rotational speed equals the synchronous rotational speed to which the fundamental frequency corresponds) in the present embodiment. Therefore, by enhancing at least one rotational speed threshold value, the motor can be enabled to achieve a larger torque within the partial speed range.

Embodiment 7

In the present embodiment, the control method of the electronic pole changing-based induction motor control system in Embodiment 6 is applied to the induction motor control system having two three-phase windings in Embodiment 2. A first rotational speed threshold value is set as a synchronous rotational speed to which the fundamental frequency corresponds when the motor forms two pole pairs, and a second rotational speed threshold value is set as a synchronous rotational speed to which the fundamental frequency corresponds when the motor forms one pole pair. When the synchronous rotational speed of motor is between the first rotational speed threshold value and the second rotational speed threshold value, the motor provides a second constant torque. Particularly, the first constant torque is greater than the second constant torque. It is assumed that the second constant torque is 100% and the first constant torque is 200%. Particularly, when the fundamental frequency is 50 Hz, the first rotational speed threshold value is 1500 round/min and the second rotational speed threshold value is 3000 round/min.

Figure 5:
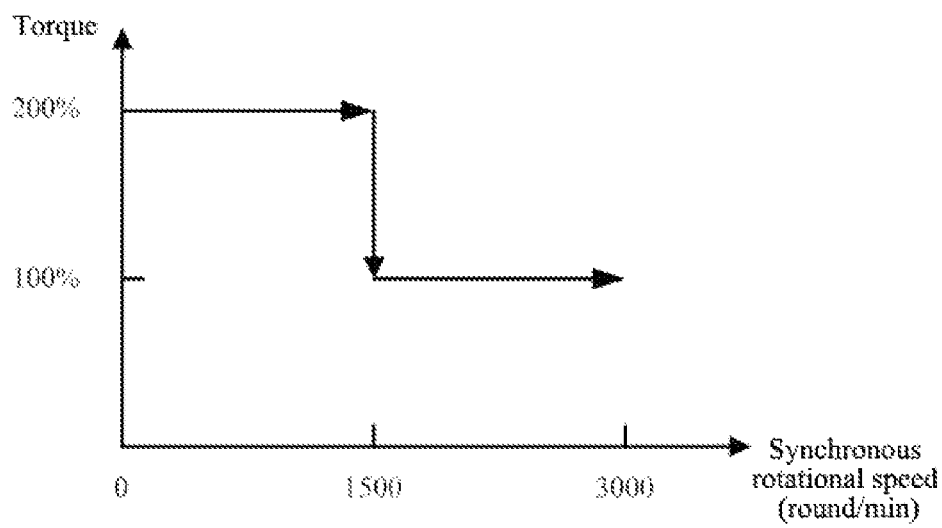
FIG. 5 is a curve graph of synchronous rotational speed to torque when an induction motor control system switches from two pole pairs to one pole pair in one embodiment.

As shown in FIG. 5, in the case of increasing the synchronous rotational speed of motor:

When the motor is activated, the synchronous rotational speed of motor is relatively low, and by controlling the inversion driving unit to generate current, the present pole-pair number of the motor is 2. When the synchronous rotational speed of motor is less than 1500 round/min, the motor provides the first constant torque; and when the synchronous rotational speed of motor increases to 1500 round/min, the control unit controls the inversion driving unit 1a to alter the current direction of the three-phase winding 1a or controls the inversion driving unit 2a to alter the current direction of the three-phase winding 2a, making the present pole-pair number of the motor decrease to 1. When the synchronous rotational speed of motor is between 1500 round/min and 3000 round/min, the motor provides the second constant torque.

Figure 6:
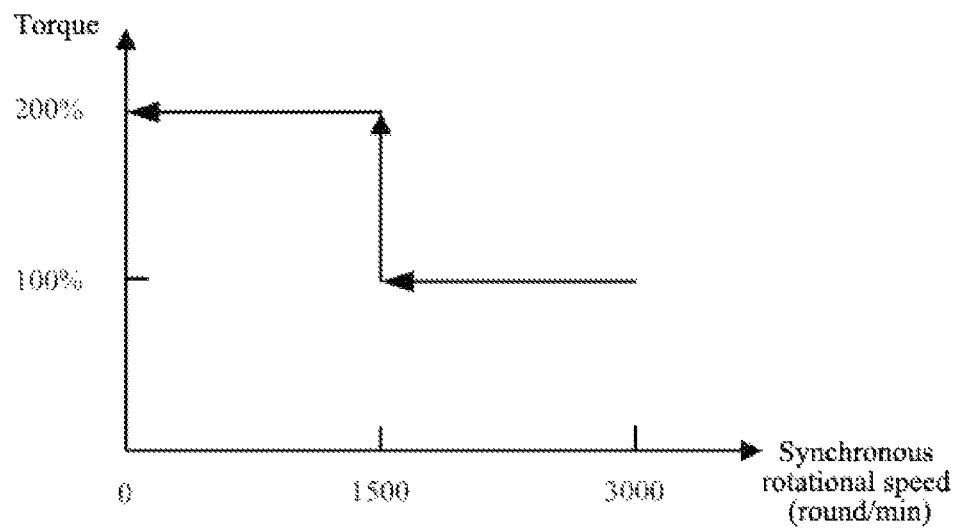
FIG. 6 is a curve graph of synchronous rotational speed to torque when an induction motor control system switches from one pole pair to two pole pairs in one embodiment.

As shown in FIG. 6, in the case of decreasing the synchronous rotational speed of motor:

During that the synchronous rotational speed of motor decreases from 3000 round/min to 1500 round/min, the pole-pair number of the motor is 1 and the motor provides the second constant torque; and when the synchronous rotational speed of motor decreases to 1500 round/min, the control unit controls the inversion driving unit 1a to alter the current direction of the three-phase winding 1a or controls the inversion driving unit 2a to alter the current direction of the three-phase winding 2a, making the present pole-pair number of the motor increase to 2. During that the synchronous rotational speed of motor decreases from 1500 round/min to 0, the motor still provides the first constant torque.

Therefore, the control method of the electronic pole changing-based induction motor control system in the present embodiment can enable the induction motor control system to achieve a stable torque within a rotational speed range of 0-3000 round/min, thus achieving stable operation.

Besides, in order to achieve a larger torque within partial speed range, at least one rotational speed threshold value can be enhanced according to flux-weakening property of the motor. For example, the first rotational speed threshold value is increased to 2000 round/min.

Figure 7:
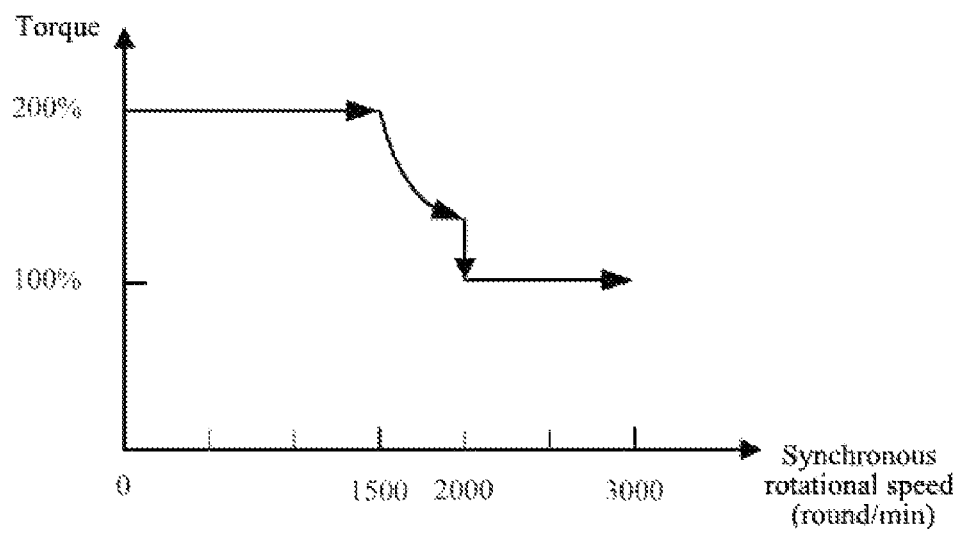
FIG. 7 is a curve graph of synchronous rotational speed to torque when an induction motor control system switches from two pole pairs to one pole pair in another embodiment.

As shown in FIG. 7, in the case of increasing the synchronous rotational speed of motor:

When the synchronous rotational speed of motor is less than 1500 round/min, the motor provides the first constant torque; and when the synchronous rotational speed of motor increases to 1500 round/min, the pole-pair number of the motor temporarily stays unchanged until the synchronous rotational speed of motor increases to 2000 round/min, and then the present pole-pair number of the motor is decreased to 1. During that the synchronous rotational speed increases from 1500 round/min to 2000 round/min, the torque of motor decreases non-linearly, but the motor can achieve a torque which is larger than the second constant torque.

Figure 8:
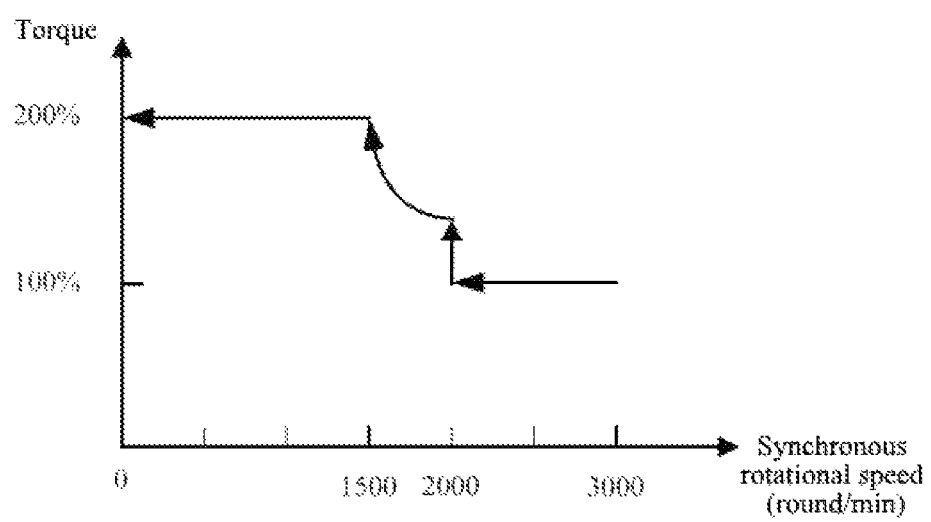
FIG. 8 is a curve graph of synchronous rotational speed to torque when an induction motor control system switches from one pole pair to two pole pairs in another embodiment.

As shown in FIG. 8, in the case of decreasing the synchronous rotational speed of motor:

When the synchronous rotational speed of motor decreases from 3000 round/min, during that the synchronous rotational speed of motor decreases from 3000 round/min to 2000 round/min, the pole-pair number of the motor is 1, and the motor provides the second constant torque; and when the synchronous rotational speed of motor decreases to 2000 round/min, the present pole-pair number of the motor is increased to 2 in advance. During that the synchronous rotational speed decreases from 2000 round/min to 1500 round/min, the torque of motor increases non-linearly, and the motor can achieve a torque which is larger than the second constant torque.

Embodiment 8

The difference of a control method of the electronic pole changing-based induction motor control system in the present embodiment from that in Embodiment 7 lies in that: the control unit controls the inversion driving unit 1a to alter the current phase angle of the three-phase winding 1a, or the control unit controls the inversion driving unit 2a to alter the current phase angle of the three-phase winding 2a, to alter the pole-pair number of the motor.

The electronic pole changing-based induction motor control systems and the control methods thereof in Embodiments 1-8 in the present invention can be applied to electric vehicles, elevators, machine tool servo system and the like which require an induction motor control system that can provide a large torque at low speed and have wider speed governing operation range.

Terms "the first", "the second" and the like employed in the present invention are expressions used for description without particular meanings, and therefore it shall be understood that they are not limitations to the present invention.

Although the present invention is described in combination with specific embodiments, it is obvious for those skilled in the art to make many substitutions, modifications and variations according to the above. Therefore, all such substitutions, modifications and variations are included in the spirit and scope of the claims accompanied hereinafter.

What is claimed is:

1. An electronic pole changing-based induction motor control system, comprising a motor, an inverter and a DC power supply; the inverter connected with the motor and the DC power supply respectively, for converting a direct current supplied by the DC power supply to an alternating current supplied to the motor; characterized in that, the motor comprises N three-phase windings, wherein N is an integer bigger than 1; the inverter comprises N inversion driving units and at least one control unit; each inversion driving unit is connected with one three-phase winding; the control unit controls the inversion driving unit to generate a current of the three-phase winding connected thereto; the control unit comprises a synchronous rotational speed operation module, for calculating a synchronous rotational speed of the motor; and the control unit alters current directions or phase angles of at least part of the three-phase windings according to the synchronous rotational speed of the motor, making said N three-phase windings form at least two pole-pair numbers, wherein one or more rotational speed threshold values are set and one rotation speed threshold value corresponds to one pole-pair number.

2. The electronic pole changing-based induction motor control system according to claim 1, wherein the inversion driving unit comprises three output ends, each three-phase winding comprises three sub-windings, and input ends of said three sub-windings are respectively connected with said three output ends of the inversion driving unit.

3. The electronic pole changing-based induction motor control system according to claim 1, wherein said N three-phase windings form a NY structure or a N Δ structure or an aYbΔ structure, wherein both a and b are integers bigger than 1, and a+b=N.

4. The electronic pole changing-based induction motor control system according to claim 1, wherein the inverter comprises one control unit which controls said N inversion driving units respectively; or the inverter comprises a plurality of control units, and each control unit controls one or more inversion driving units.

5. The electronic pole changing-based induction motor control system according to claim 1, wherein the control unit is one or more of MCU, DSP, FPGA and CPLD.

6. A control method of the electronic pole changing-based induction motor control system according to claim 1, characterized in that, the control unit controls the inversion driving unit to generate a current of the three-phase winding connected thereto; the control unit alters current directions or phase angles of at least part of the three-phase windings according to the synchronous rotational speed of the motor, making said N three-phase windings form at least two pole-pair numbers; and the control unit controls said N inversion driving units according to the synchronous rotational speed of the motor, to alter the current directions or phase angles of at least part of the three-phase windings, making the motor switch between the at least two pole-pair numbers.

7. The control method of the electronic pole changing-based induction motor control system according to claim 6, wherein each said rotational speed threshold value equals a synchronous rotational speed to which a fundamental frequency corresponds when the motor forms the pole-pair number which corresponds to the rotational speed threshold value.

8. The control method of the electronic pole changing-based induction motor control system according to claim 6, wherein at least one rotational speed threshold value is greater than a synchronous rotational speed to which a fundamental frequency corresponds when the motor forms the pole-pair number which corresponds to the rotational speed threshold value, and other rotational speed threshold values equal the synchronous rotational speeds to which the fundamental frequency corresponds when the motor forms the pole-pair numbers which correspond to these rotational speed threshold values; an increased amplitude of said at least one rotational speed threshold value is set according to flux-weakening property of the motor.

9. The control method of the electronic pole changing-based induction motor control system according to claim 7, wherein when the synchronous rotational speed of the motor increases to one of the rotational speed threshold values, the control unit alters the current directions or phase angles of at least part of the three-phase windings, making the pole-pair numbers formed by said N three-phase windings decrease; and when the synchronous rotational speed of the motor decreases to one of the rotational speed threshold values, the control unit alters the current directions or phase angles of at least part of the three-phase windings, making the pole-pair numbers formed by said N three-phase windings increase.

10. The control method of the electronic pole changing-based induction motor control system according to claim 8, wherein when the synchronous rotational speed of the motor increases to one of the rotational speed threshold values, the control unit alters the current directions or phase angles of at least part of the three-phase windings, making the pole-pair numbers formed by said N three-phase windings decrease; and when the synchronous rotational speed of the motor decreases to one of the rotational speed threshold values, the control unit alters the current directions or phase angles of at least part of the three-phase windings, making the pole-pair numbers formed by said N three-phase windings increase.

11. The control method of the electronic pole changing-based induction motor control system according to claim 6, wherein the inversion driving unit comprises three output ends, each three-phase winding comprises three sub-windings, and input ends of said three sub-windings are respectively connected with said three output ends of the inversion driving unit.

12. The control method of the electronic pole changing-based induction motor control system according to claim 6, wherein said N three-phase windings form a NY structure or a NΔ structure or an aYbΔ structure, wherein both a and b are integers bigger than 1, and a+b=N.

13. The control method of the electronic pole changing-based induction motor control system according to claim 6, wherein the inverter comprises one control unit which controls said N inversion driving units respectively; or the inverter comprises a plurality of control units, and each control unit controls one or more inversion driving units.

14. The control method of the electronic pole changing-based induction motor control system according to claim 6, wherein the control unit is one or more of MCU, DSP, FPGA and CPLD.

15. The control method of the electronic pole changing-based induction motor control system according to claim 14, wherein each said rotational speed threshold value equals a synchronous rotational speed to which a fundamental frequency corresponds when the motor forms the pole-pair number which corresponds to the rotational speed threshold value.

16. The control method of the electronic pole changing-based induction motor control system according to claim 14, wherein at least one rotational speed threshold value is greater than a synchronous rotational speed to which a fundamental frequency corresponds when the motor forms the pole-pair number which corresponds to the rotational speed threshold value, and other rotational speed threshold values equal the synchronous rotational speeds to which the fundamental frequency corresponds when the motor forms the pole-pair numbers which correspond to these rotational speed threshold values; an increased amplitude of said at least one rotational speed threshold value is set according to flux-weakening property of the motor.

17. The control method of the electronic pole changing-based induction motor control system according to claim 14, wherein when the synchronous rotational speed of the motor increases to one of the rotational speed threshold values, the control unit alters the current directions or phase angles of at least part of the three-phase windings, making the pole-pair numbers formed by said N three-phase windings decrease; and when the synchronous rotational speed of the motor decreases to one of the rotational speed threshold values, the control unit alters the current directions or phase angles of at least part of the three-phase windings, making the pole-pair numbers formed by said N three-phase windings increase.

* * * * *